United States Patent [19]
Leeb

[11] Patent Number: 5,727,910
[45] Date of Patent: Mar. 17, 1998

[54] MILLING AND DRILLING TOOL

[76] Inventor: Felix Leeb, zum Espat 3, D-94405 Landau/Isar, Germany

[21] Appl. No.: 656,263
[22] PCT Filed: Dec. 1, 1994
[86] PCT No.: PCT/EP94/04017
  § 371 Date: Jun. 10, 1996
  § 102(e) Date: Jun. 10, 1996
[87] PCT Pub. No.: WO95/16534
  PCT Pub. Date: Jun. 22, 1995

[30] Foreign Application Priority Data

Dec. 14, 1993 [DE] Germany .......................... 43 42 557.7

[51] Int. Cl.⁶ .................................................. B23P 15/28
[52] U.S. Cl. ............................ 407/34; 407/113; 407/114
[58] Field of Search ................................ 407/113, 114, 407/34, 40, 48, 61; 409/74, 78, 132, 131

[56] References Cited

U.S. PATENT DOCUMENTS 4,572,042  2/1986  Wilman ........................... 407/114
5,145,295  9/1992  Satran ............................ 407/113
5,232,319  8/1993  Satran ............................ 407/113
5,593,255  1/1997  Satran ............................ 407/113

FOREIGN PATENT DOCUMENTS 3831046  3/1990  Germany .
3909077  12/1994  Germany .

Primary Examiner—A. L. Pitts
Assistant Examiner—Mark Williams
Attorney, Agent, or Firm—Anderson, Kill & Olick, P.C.

[57] ABSTRACT

A milling and drilling tool for forming openings such as fits, blind or threaded holes, and the like in a solid material, and including an insert having a plurality of face cutting edges forming an inwardly directed v-shaped cutting edge geometry, inner and outer flank cutting edges, and radii-formed cutting edge transitions between the inner and outer flank cutting edges, with the face and flank cutting edges and transitions being arranged in pairs mutually offset by 180°, and with outer cutting edges and non-cutting portions, with cutting portion being divided by a further chisel edge into roughing and finishing cutting portions.

10 Claims, 9 Drawing Sheets

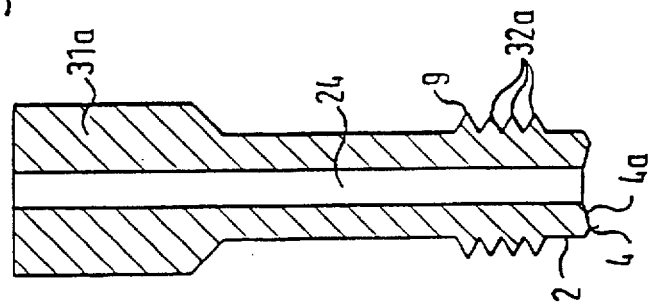
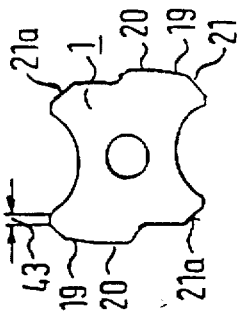
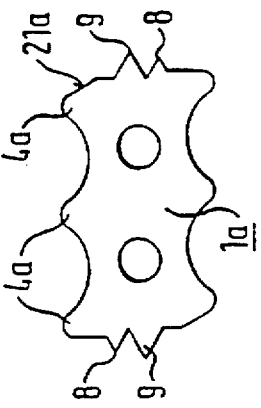
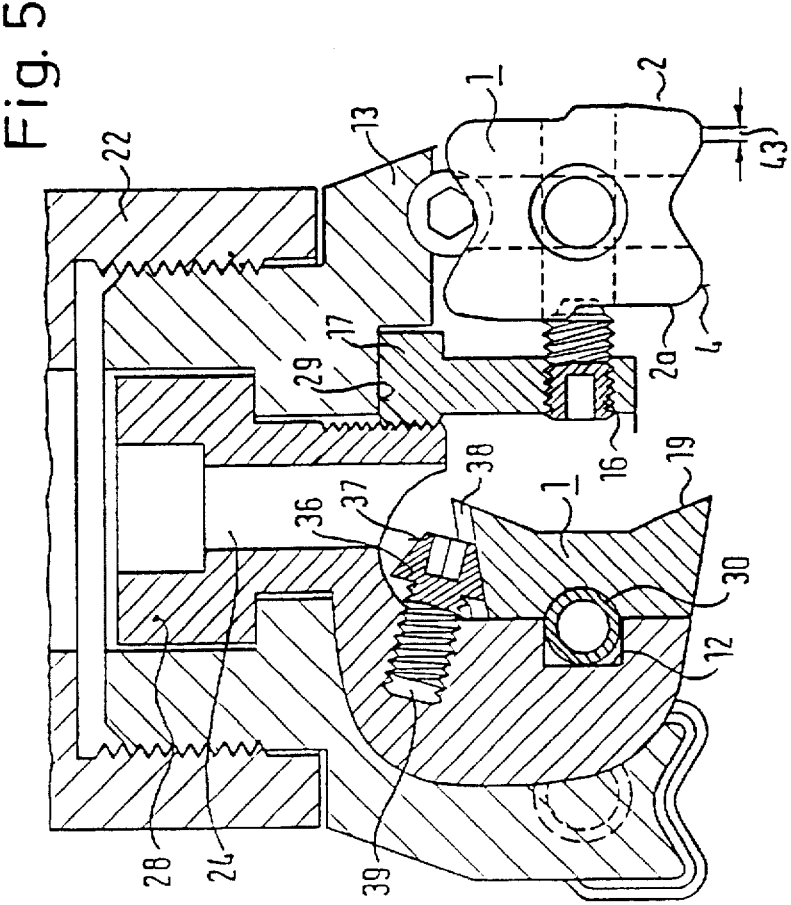
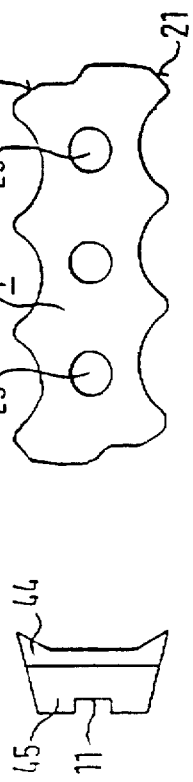

MILLING AND DRILLING TOOL

BACKGROUND OF THE INVENTION

1. Field of the Invention

The invention relates to a milling and drilling tool for producing openings such as fits, blind holes, or threaded holes having any diameter within predetermined range in a solid material, with the milling and drilling tool being rotatably guided and axially displaced along a circular path about an axis of an opening by, e.g., by a CNC-controlled machine-tool, and being provided with face cutting edges, which are arranged on a cutting insert for forming a cored opening, with the face cutting edges having an inwardly directed V-shaped cutting edge geometry, and with inner and outer flank cutting edges and radius-formed cutting edge transition.

2. Background of the Invention

German publications Nos. 3,909,077 and 3,831,046 disclose milling cutters of the above-mentioned type for forming bores, fits, recesses, threads in solid material when used in CNC machine tools or the like. In order to form a cored recess or bore with a single cutting unit, cutting inserts having outer and inner flank cutting edges and two radius-shaped face cutting edges are used. With this cutting edge geometry forming of fits in solid material became possible due to the reduction in axial resistance, and this cutting geometry substantially increased the operating life of the face cutting edges because the latter continuously come out of the cutting engagement due to the circular nature of the milling process. Both systems have certain drawbacks as during forming of fits so during forming of a thread. A substantial drawback of the reversible cutting insert of the German publication No. 3,909,077 consists in that two plates are used to form a milling cutter having the above-described cutting edge geometry, whereby the number of cutting edges, which can be used, is substantially limited because only a limited number of cutting inserts can be mounted on a milling cutter shank. In addition, securing of a milling cutter shank is difficult and, thereby, is naturally very expensive. The problem associated with cutting inserts of the German publication No. 3,831,046 consists in that, because of the manner of their mounting they cannot be formed as reversible inserts, and besides, their mounting is technically complicated and, therefore, expensive. In addition, during the milling process, the inserts have a tendency to become loose. A further problem with conventionally used reversible cutting inserts consists in that the flank edges should have a substantial length in order to insure, on one hand, an adequate stability and on the other hand, their appropriate mounting on the milling cutter shank. This drawback adversely affects the intended use of the insert, in particular, when the insert is used for forming fits in the solid material, because the flank cutting edges should be arranged on the milling cutter shank at a precise angle relative to the cutter axis, almost with a hundred percent precision, to insure cutting of a corresponding fit, otherwise the cut bore would have a larger dimension in the upper region than in the lower region or at the cutter base. Also, thereby the reversible cutting edges would unnecessary premature partially wear off. Thereby, it was determined in practice that with such a tool, because of the required length of the flank cutting edges, the necessary fit dimensions cannot be obtained. A further problem consists in that the cutting area of the reversible insert, which provides for rough machining, does not have an ideal cutting edge geometry, and this is associated with increased energy and power requirements which the machine tool must meet, and in addition, the service life of the cutter insert is decreased.

A further problem consists in the need to adjust each cutting edge separately circumferentially and angularly in the micron region because, as the practice has shown, without the possibility of a such circumferential adjustment, forming of a fit with a tool, which is equipped with a plurality of reversible cutting inserts, in a contemplated milling process is not possible. In addition, the practice of serial production has shown that is case when the face cutting edges are even slightly worn out and blunt, a second operational step with an identical tool and the same program flow, though taking into consideration the dimensional deviations, must be carried out for forming the fit. At that, this additional program flow often results in a non-contemplated outcome because the worn-out cutting region precedes the good (sharp) cutting region and prevents the tool from following the preprogrammed path as the blunt cutting edges prevent a correction of a not-any-more calculable deviation of dimensions of a produced recess (fit) in the micron region due to their frictional engagement with the already formed walls of the recess. This problem of course also exists in milling cutters which are made with final dimensions or are already equipped with a through-insert due to dimensional considerations.

A still further problem consists in that in large diameter milling cutters equipped with reversible cutting inserts, the edge-free space in the middle of inner flank cutting edges is very large, whereby the necessary minimal attachment (the uniform attachment in the middle) correspondingly increases, so that the production time, when such milling cutters are used for forming bores, also increases, which adversely affects the economy of using such tools in a serial production. During the formation of a thread in a solid material, the same problems arise during the use of cutting inserts when the latter should be replaced or a large thread diameter should be obtained. A further problem which arises when the end product is a thread, consists in that during the machining of the same material, the thread-forming cutting edges become blunt much more rapidly in comparison with the core-extracting cutting edges, and the possible service life of the core-extracting cutting edges cannot be completely utilized, and no thread in a solid hardened material can be formed when only one thread-forming tooth is available. Further, new cutting materials for use in milling cutters are developed all the time which are characterized by a high cutting speed and an increased service life. However, their drawback consists in that they are rather extensive which leads us back to the basic cutting materials. Another problem consists in that with this solution, the contemplated cutting edge geometry of a reversible cutting insert can be secured on an insert carrier or a tool shank with difficulty.

The object of the invention is to provide a milling and drilling tool of the above-described type with a corresponding cutting edge geometry, formed both as a solid element and as a reversible insert, for forming precise circular bores and bores with inner thread and the like in the solid material, and which is characterized by improved and simplified mounting, centering and alignment of the reversible insert on a tool shank or an insert carrier in comparison with conventional tool.

SUMMARY OF THE INVENTION

This object is achieved according to the invention by arranging on a reversible insert, which is fastened to a tool shank in an aligning position with the use of aligning and centering means and at least one connection element provided on the shank contacting surface of the insert, in pairs and mutually offset by 180°, face cutting edges forming at least one V-shaped cutting edge geometry, together with at least inner and outer flank cutting edges and radii-formed cutting edge transitions, with the outer flank cutting edges divided into a cutting portion and a non-cutting portion by at least one chisel edge so that both portions of the outer flank cutting edge of a side of a reversible insert are offset relative to each other.

In particular, the invention proposes to apply the cutting edge geometry, which characterizes the cutting insert of German publication No. 3,831,046, to opposite sides of a cutting insert so that this insert can be used in the same way as a reversible insert. The invention further proposes to separate outer and inner flank cutting edges of a utilized cutting insert, formed as a reversible plate, into two, slightly offset relative to each other, cutting edge portions with a chisel edge. At that, the upper half of the outer flank cutting edge is offset inward so that it does not come into a cutting engagement. This reduced cutting region can further be subdivided in its front region to form a roughing cutting edge which, in turn, is caused to project slightly outwardly by another chisel edge to form a finishing cutting edge. Thereby, the so divided cutting edges can be formed once as a roughing edge with a cutting edge geometry ideal for roughing inserts, with the following finishing cutting edges being provided with a cutting edge geometry appropriate for such an insert. To achieve this ideal roughing cutting edge geometry, it is proposed to form the cutting edge twisted, extending at an angle to the cutter axis and provide it with a chamfer which insures, as known, carrying away of the chips. On the other hand, it can be provided that the chips, which are cut off with these roughing cutting edges, do not come into contact with the finishing cutting edges which follow the roughing cutting edges. It is further proposed to form the innermost flank cutting edges of a cutting insert as a chamfer having a dimension of an intended feed dimension along the Z-axis, whereby the cutting edge resistance with such a cutting edge is reduced. The inwardly located flank cutting edges should at that extend parallel to the milling cutter axis so that they are always in a positive cutting engagement.

It is further proposed to form the face cutting region of cutting edges located between outer cutting edges (the outer circumferential edges) which extend in the rotational direction or are inclined toward the cutter axis, extending in the given direction. It is further proposed to blunt the face cutting edges along a small part thereof. The above-mentioned chisel edges are set up as follows in order to solve the problem of forming of fits in a solid material. E.g., when a blind hole fit is formed, a milling and drilling tool, which is equipped with reversible inserts having a continuous but shortened flank cutting edge, is displaced by a CNC-controlled machine tool, during the process of forming a threaded bore in a solid material, in the formed opening somewhat beyond the desired depth. There, the machine tool effects rounding off of the milling cutter path without a Z-axis feeding to form an even bottom of the blind opening. In this way, the roughing step ends. During the following finishing step, the program flow is repeated in a reverse order, i.e., a further milling cutter path rounding off, with a respective dimension feed (Z- and diameter dimensions) corresponding to the feed dimension of the roughing step, takes place. Then, proceeding from this starting depth, the program flow follows in the reverse order back toward the starting point (beginning of the openings). This means that the formed fit is being formed starting from the bottom of the opening. Thereby, a plurality of fits can be formed with one milling and drilling tool or one cutting edge set, because the cutting edge region, which is responsible for the roughing step, is not involved in the cutting process when the end product (fit) is formed, whereby the length dimension (as well as the diameter dimension) of blunt (worn) cutting edge portions become smaller.

It should be pointed out that the flank cutting edge length from the face radius or a phase should be at least twice of a Z-axis feed dimension per rounding up. Thereby, the cutting edges, which function as finishing cutting edges, during the roughing step, come into engagement only at the circumferential wall of the opening which means that the ratio of this cutting engagement with respect to the cutting edges effecting rough cutting is about 1:50. For two additional runs (equal, respectively, to the return path from the end of the milling step to the beginning point of the program), the same results can be achieved in case of the milling and drilling tool having cutting edges the utilized outer flank cutting edges of which are divided one more time in roughing and finishing cutting edges, with the roughing cutting edges being disengaged during the finishing step with the same repetition of the program and the same feed dimension. In this milling process, the above-mentioned chisel edges also participate in milling.

At that, the fit dimension can naturally be obtained with this, divided one more time, cutting edges (roughing and finishing cutting edges) starting from the bottom of the opening. In the serial production, it is possible, in the majority of cases, to form a fit with such a tool in one operational step in a solid material without adjusting any dimension.

This milling process can naturally be used for forming through-passages and similar openings, e.g., pockets in a solid material. To solve the problem of too large cutting edge-free space when large openings and threaded bores are formed, it is proposed to provide this space partially with cutting edges. This can be achieved by providing the ring, which is used for the adjustment of the roundness, partially with a cutting insert, wherein the latter extends not to the middle of the milling and drilling tool. It is also provided that only each second or third circumferential cutting edge, dependent on the number of available cutting edges, is provided in this inner region with additional cutting edges which also do not extend to the middle of the tool, so that this cutting edge free space somewhat corresponds to the distance with which the face cutting edges of a reversible insert are arranged.

It is further proposed to make the reversible plate wider so that it would have more than two face cutting edges of the above-discussed cutting edge geometry. It is further contemplated to form the cutting insert with different widths to provide in the milling tool an adequate free space for cutoff minute chips. At that, this insert with a variable width, e.g., can have from two to three face cutting edges, or from two to four, or from three to five cutting edges.

Further, when wide inserts are used, it can be advantageous to have several inserts of the same width. In addition, in case of forming of a blind opening, all face cutting edges should lie in the same plane.

In order to solve the problem of aligning of the outer flank cutting edges with the cutter axis and in order to be able to adjust their concentricity in the micron region, it is proposed to use the inner edge-free space for this purpose by providing a ring in this space and by providing stud screws in the contact region of the reversible insert at the location of this ring. The stud screws are displaced by a key from outside, with the stud screws being displaced in side openings (in the contact surface), whereby the reversible insert can be moved slightly (in the micron region) outwardly away from the cutter axis by pressure action.

It is further contemplated to provide in a reversible insert having more than two face cutting edges, more than one opening for a displaceable screw. It is also possible to insert a screw in one of these openings when the necessary threaded opening in the cutter shank is not located at 90° to the cutter axis or is offset to the insert bore, whereby it becomes possible to slightly displace the reversible insert by the so-located screw in this offset direction relative to the cutter axis by the pressure action in the micron region, and to adjust the concentricity of this insert. It is necessary to be able to obtain this, inclined to the cutter axis, position of the screw so that this inclined position can occur only in the direction toward the cutter axis, which means that the insert can be displaced only in the direction of the cutter axis. Because with the above-discussed solution in association with a stud screw, the insert can be displaced only in an opposing direction relative to the cutter axis, it is further contemplated to form the bores, which extend at 90° to the cutter axis, with a different distance from this axis in order to be able to compensate this different distance with an appropriate adjustment system. In order to be able to mount the reversible insert at the same height with respect to the Z-axis, it is contemplated to provide, dependent on the number of available face cutting edges per an insert, at least one screw with a conical surface which is screwed in a corresponding threaded bore provided in the cutter shank which bore extends at an angle to the contact surface of the insert, whereby the insert can be adjusted relative to the Z-axis by pressure applied to the insert supporting surface. The screw is displaced by rotating it with a key so that the conical surface of the screw abuts the wall of the radius-shaped opening in the insert.

With a large diameter of the milling cutter, the adjustment of the concentricity by using the ring mountable in the middle of the cutter and the stud screws provided therein can be dispensed with, because with such a cutter diameter, only inserts with more than two face cutting edges and at least with two bores are used, so that the adjustment of the concentricity can be effected by using the second bore. Thereby, this ring is available completely for receiving of the reversible insert.

It is further contemplated that this ring insures the same seating and provides for the same adjustment of the insert along the Z-axis as the cutter shank. This ring, which is equipped with the inserts, can be eliminated when only pockets in a solid material need be made, whereby the axial resistance is reduced and, at the same time, the cutting inserts can be spared.

It is to be pointed out that by the program flow of the milling process of forming a blind bore fit, the required fit dimension cannot be obtained in the roughing region (feed region in the Z-axis per turn) as the cutting edges, which are used as roughing cutting edges, has already become worn, or the cutting edges are formed as roughing and finishing cutting edges. This, however, does not constitute a drawback because the counterpart, which should be inserted into the fit, in this region normally, is provided with a chamfer.

Further, the testing of the formed fit can be completely eliminated because the cutting edges, during the finishing step, are in an unsubstantial cutting engagement so that the stability of the usable milling and cutting tool should be adequate even when very small fits are formed.

In order to be able to attach reversible inserts to a cutter shank in a simple, satisfactory and precise manner, it is further contemplated to provide the inserts with at least one bore (in the middle of the insert) for a connection screw, as per se is known. In order to be able to attach the insert on the cutter shank, without a possibility of rotation, in a precise position, it is further contemplated to provide the cutting insert with one, two or more grooves, which may be circular. Thin-wall hollow members, in particular, small-diameter pipes, which are adapted to be engaged in the groove without a backlash, are associated with the grooves. The insert seating provided in the milling and cutting tool, on its part, has a complementary groove.

The groove provided in the insert seating has a complementary cross-section such, that, e.g., with the pipe diameter of 2 mm, the groove width is about 1.97 mm and the groove depth is about 1.28 mm, whereby a flanging radius of 0.5 mm is obtained. This provides for self-locking of the thin-wall pipe in these grooves because it is located their with a half. On the other hand, when the insert is attached to the tool shank with a screw or a clamp, the surplus material of the pipe occupies the free space of the insert. At that, with this surplus, the opening in the cutting insert has a depth of about radius, in this example, about 0.66 mm, whereby during attachment of the insert to the tool shank, a circumferential pressure is applied to the pipe, and the surplus material, due to the deformation of the pipe, fills the available space of the groove, whereby the insert always occupies its seat with a repeatable precision.

For solving the problem of forming a thread in a solid material, it is contemplated to provide the cutting insert, formed as a reversible insert, with appropriate seating and roughing cutting edge geometry, so that it can be attached to a cutter shank of a milling cutter available for forming bores. In order to better utilize the core-extracting cutting edges, it is proposed to provide in addition to the thread-forming tooth, at least one additional thread-forming tooth having a reduced dimension of its circular cutting profile and located in front of the primary thread-forming tooth, so that the available thread-forming tooth has only a finishing function. In order to provided for forming threads in already hardened material, there are provided several differently reduced cutting edges (circular toothing), wherein the milling cutter has at least its cutting edge region formed of a solid material. To solve the problem of utilization of the newest cutting materials, it is proposed to place them on a carrier material, which permits to save the cutting material, because the carrier material would insure an adequate strength. On the other hand, the insert seating for this cutting material is provided taking into the consideration the carrier material.

The invention will now be explained by way of example with reference to the embodiments shown in the drawings.

BRIEF DESCRIPTION OF THE DRAWINGS

The drawings show:

FIG. 5 a reversible insert carrier for receiving a reversible insert for thread milling and for fit milling having a concentricity adjusting possibility;

FIG. 8 a reversible insert supported on a carrier material;

FIG. 9 a reversible insert for fit milling with three openings and more than two face cutting edges;

FIG. 10 a reversible insert for thread milling;

FIG. 11 a reversible insert for fit milling with a chamfer;

FIG. 12 a one-piece milling and cutting tool for milling threads in a solid hardened material;

DETAILED DESCRIPTION OF THE PREFERRED EMBODIMENT

Figure 1:
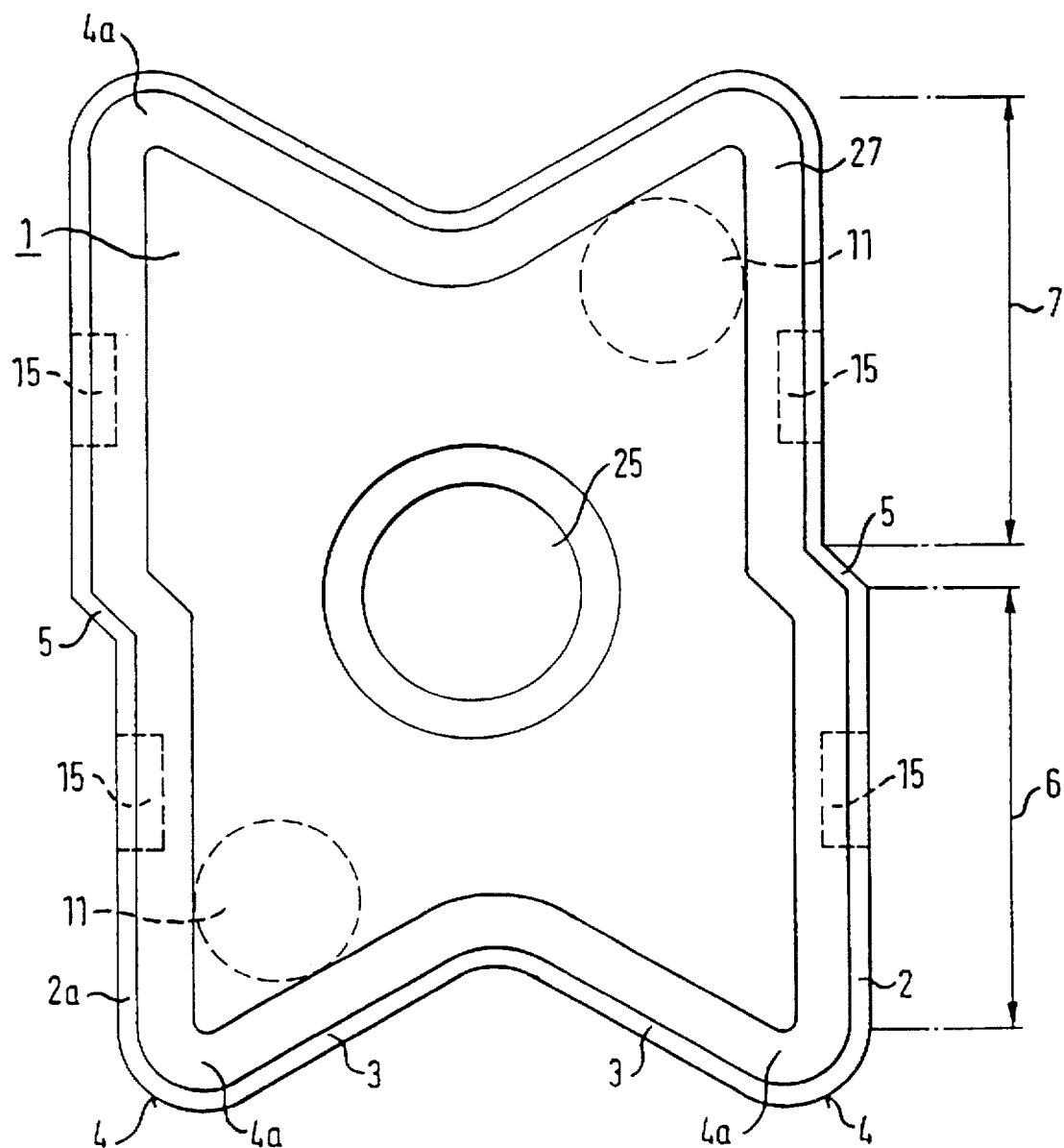
FIG. 1 a front view of a reversible cutting insert for milling a fit in a solid material with replaceable interrupted flank cutting edges.

A cutting insert having opposite V-shaped cutting edges 4a, and outer flank cutting edges 2, 2a and inner flank cutting edges 3, with the face cutting edges being formed by radii 4, can be used as a reversible insert (FIG. 1). At that, the transitions from the flank cutting edges 2 to the face cutting edges 4a can be formed by chamfers 21 and 21a (FIG. 11). This chamber 21a has a length corresponding to the length of a feed along the Z-axis, whereby an entire feed depth is obtained in this inwardly located cutting edge region with this cutting edge.

Figure 3:
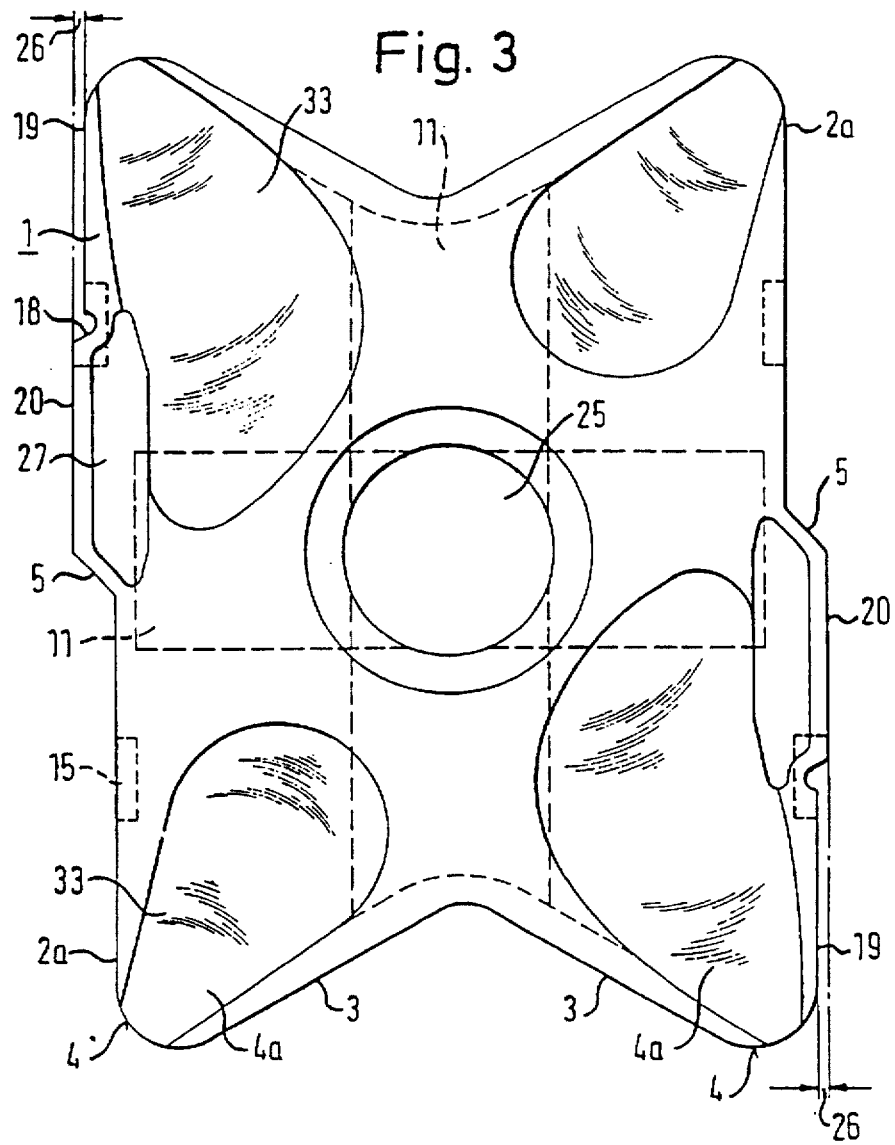
FIG. 3 the same reversible insert with outer flank cutting edges divided one more time (into roughing and finishing cutting edges)
Figure 2:
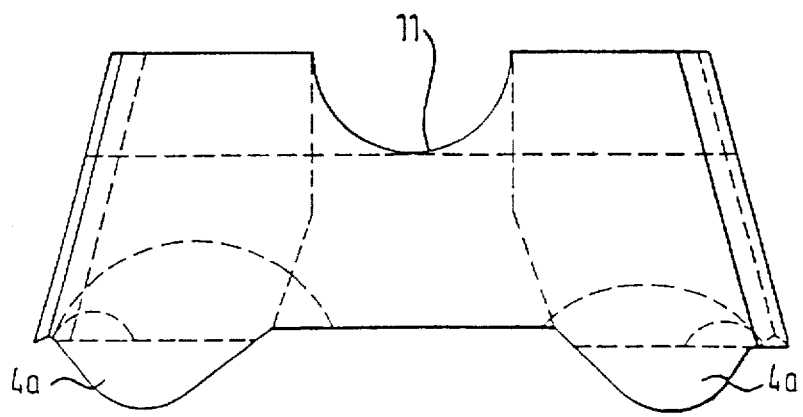
FIG. 2 a top view of this reversible insert.
Figure 4:
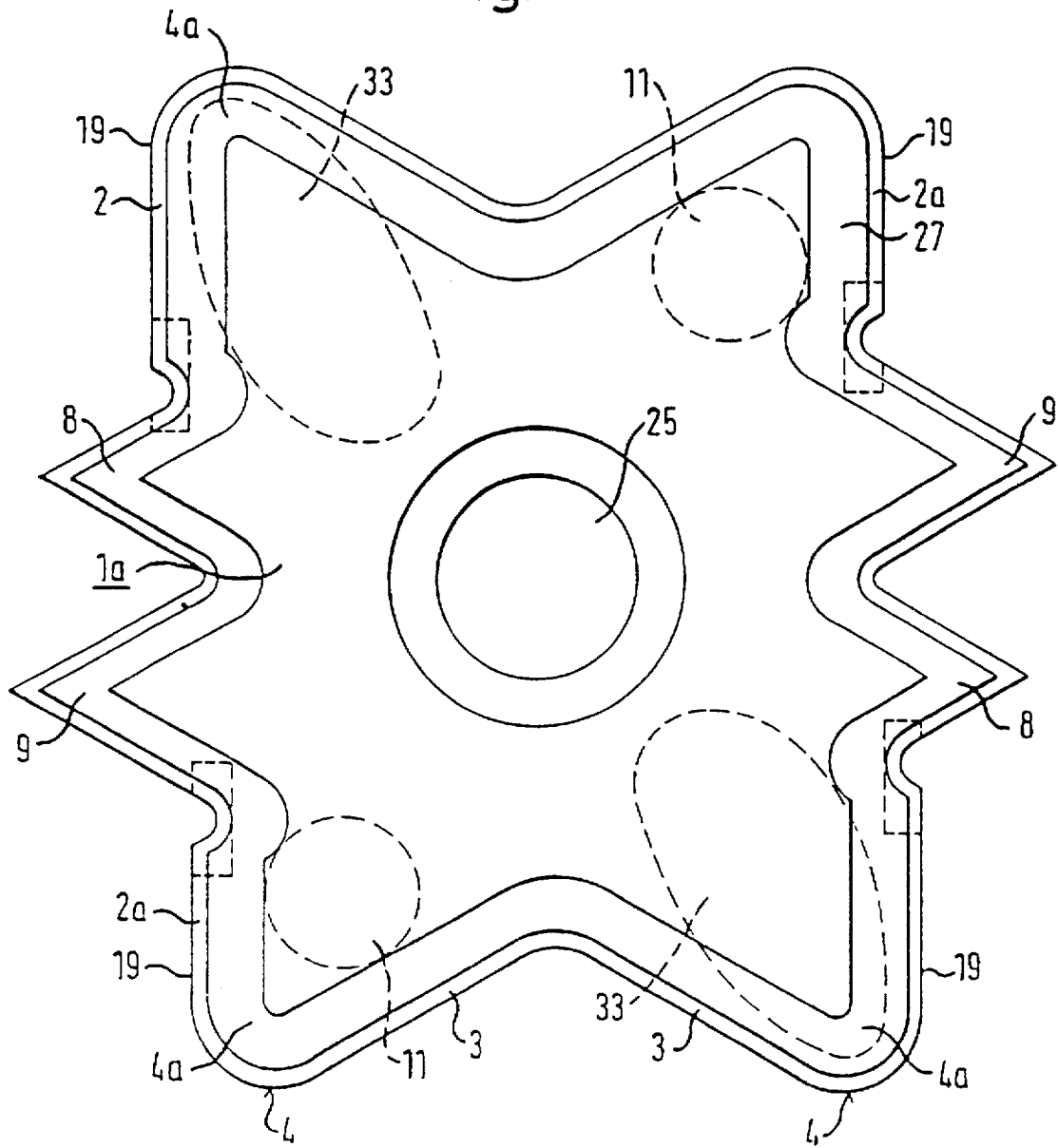
FIG. 4 a reversible insert for milling a thread in a solid material with a reduced dimension tooth located in front of the primary tooth.
Figure 7:
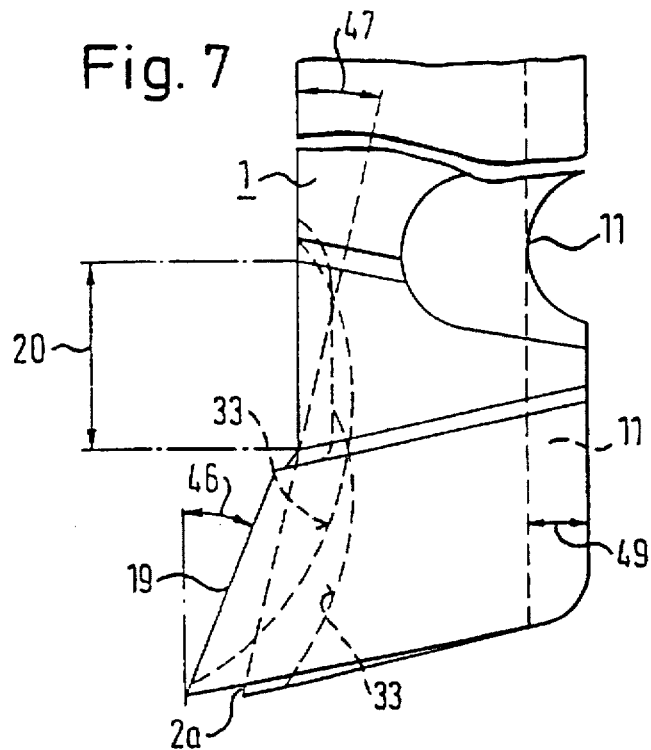
FIG. 7 a side view of a reversible insert.

A chisel edge 5 divides the outer flank cutting edge 2 into a cutting region 6 and a cutting engagement portion 7. At that, the cutting region 6 can once more be divided by a chisel edge 18 (FIG. 3) in a front region, a roughing cutting edge 19, and a following slightly outwardly projecting region, finishing cutting edge 20. At that, a chip-conducting step 27 is provided in the region of the finishing cutting edge 20. The roughing cutting edge 19 is provided with a recess 33 which prevents contact of the chips, which are carried away, with the following finishing cutting edge 20 (FIG. 7). At that, this outer roughing cutting edge 19 extends at an angle 46 to the cutter axis 35. To achieve a positive chip removal with an inwardly located roughing cutting edge, the innermost circumferential cutting edge 2a is formed so that it extends in a direction 47 parallel to the cutter axis 35 (FIG. 7).

Figure 13:
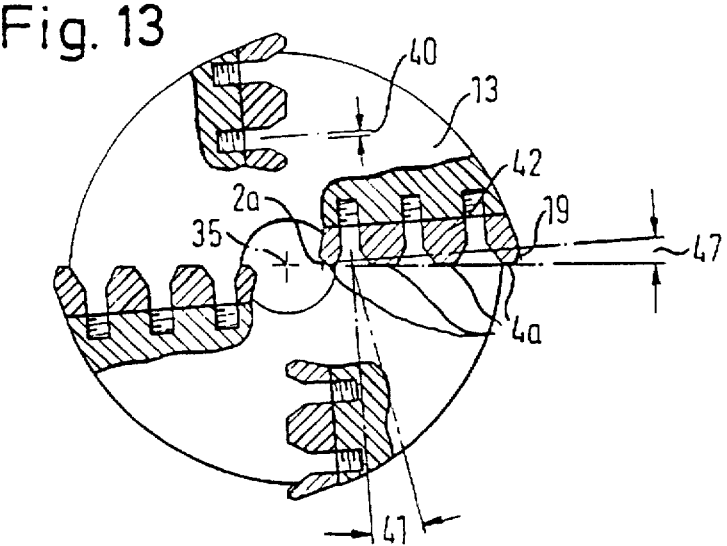
FIG. 13 a reversible insert carrier with inserts having different widths and with a concentricity adjusting possibility which is provided by the available second bore (cross-section)
Figure 14:
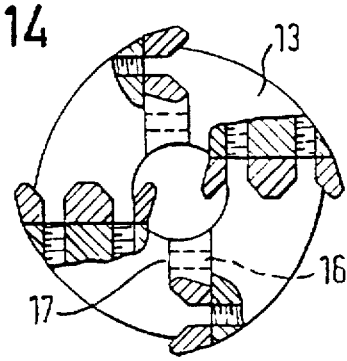
FIG. 14 a milling cutter with reversible inserts with a concentricity adjusting possibility which is provided by a ring in association with stud screws (in cross-section)
Figure 15:
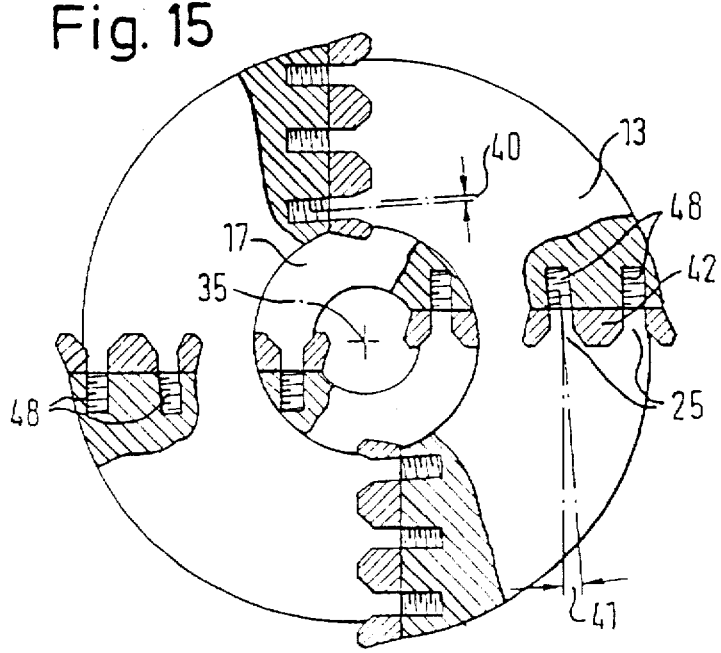
FIG. 15 a reversible insert carrier with a ring serving as an insert carrier (in cross-section)
Figure 16:
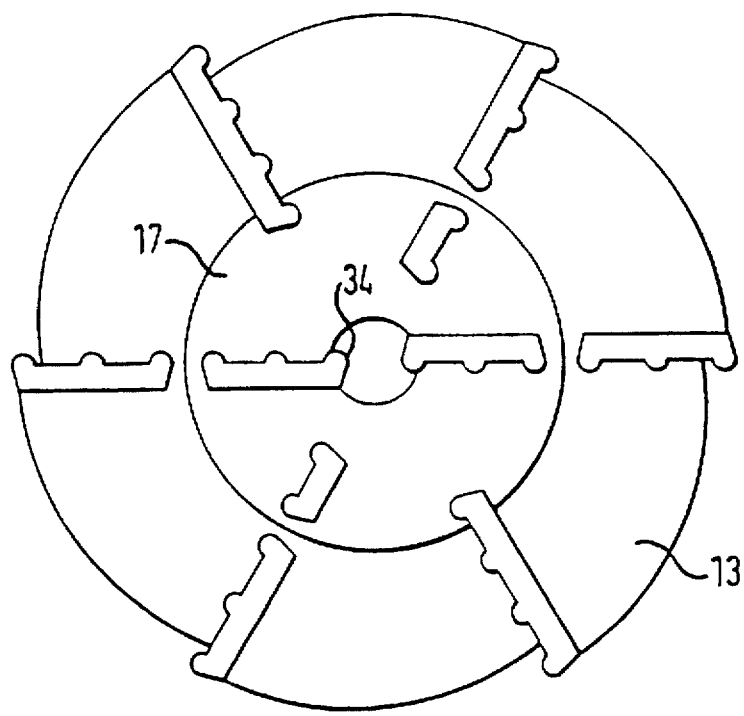
FIG. 16 a top view of a reversible insert carrier with six circumferential cutting edges.
Figure 17:
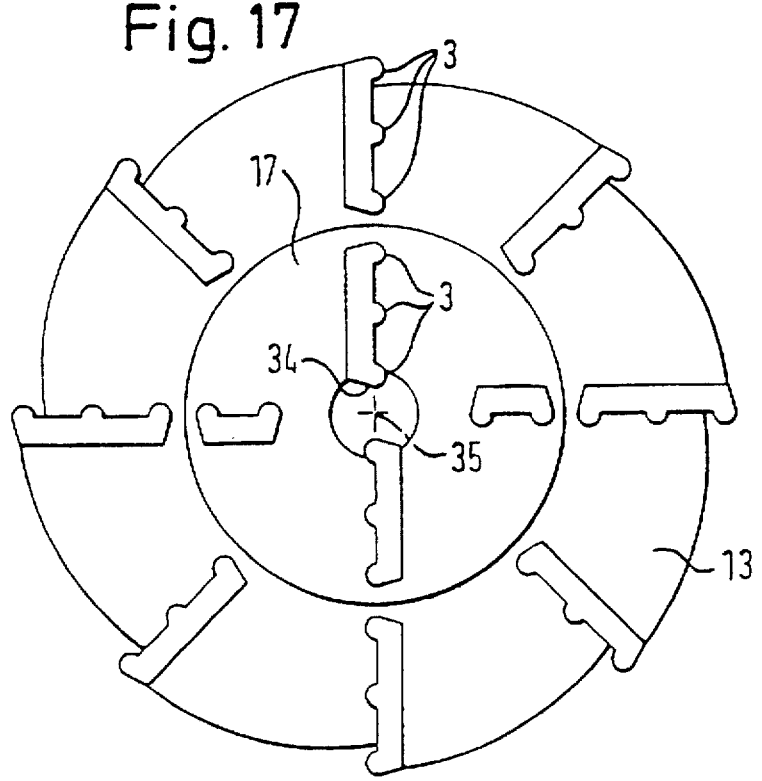
FIG. 17 a top view of a reversible insert carrier with eight circumferential cutting edges.

The cutting edges located between the face cutting edges 4a are formed, respectively, as outer flank cutting edges 17 and 2a (FIG. 13).

Further, for attaching an insert 1 to a cutter shank 22, the reversible insert carrier 13 is provided with a through bore 25 for receiving a screw and a thread 48. At that, the insert 1 may have more than one bore 25 (FIGS. 9–11, 13–15), with the number of face cutting edges 4a exceeding two. The additional bores enable to adjust the concentricity of the insert. At that, the thread bore 48 is provided in the insert 1 exactly in the middle with respect to the bore. A second thread bore 48 is somewhat offset with respect to the bore 25, with this offset being obtained by inclining this thread bore relative to the cutter axis 35. This solution is advantageous in most cases with regard to the manufacturing considerations.

For attaching the insert 1, the insert is provided with grooves 11 having a circular shape. These grooves have a shape and a depth 49 corresponding to thin-wall pipes 30 used for the attachment of the insert 1 to the insert carrier 13, with the groove depth being about one-third of the pipe diameter. The opening 12 provided in the insert carrier is designed for receiving the pipe with a press fit, and it has a depth of about 62% of the pipe diameter. Further, there is provided a free space 31 for receiving excess material resulting from the attachment of the insert to the cutter shank. The alignment of the reversible insert along the Z-axis is effected by an inclined boss screw 36 provided in the insert carrier 13, with this boss screw being provided with a conical surface 37 which, upon being unscrewed, is engaged in a circular groove 38 provided in the insert (FIG. 5).

Figure 6:
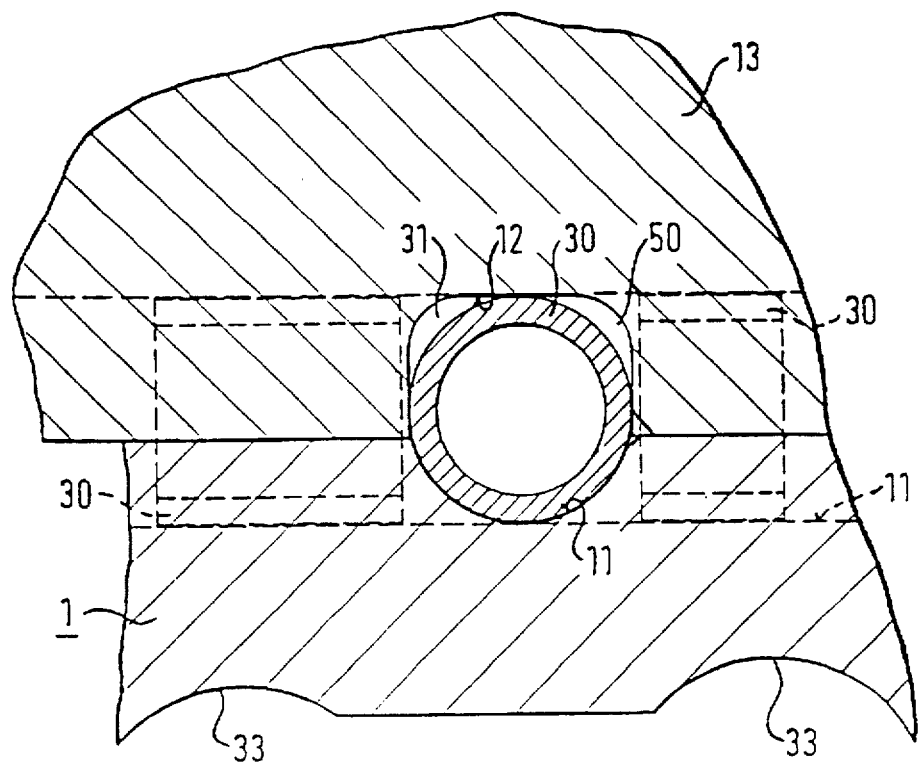
FIG. 6 a C—C cross-sectional view of this milling cutter in the insert region, including the seating.
Figure 18:
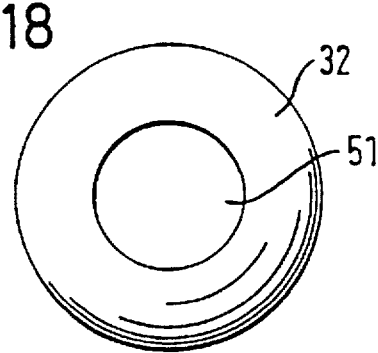
FIG. 18 a hollow ball used for attaching of the reversible cutting insert according to the present invention to the insert carrier.
Figure 19:
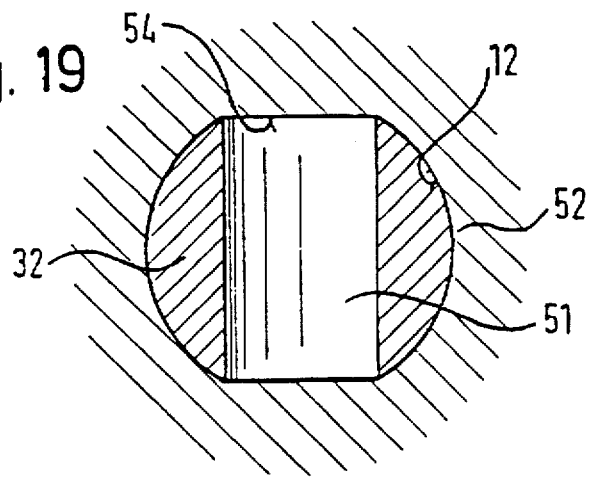
FIG. 19 a cross-sectional view showing arrangement of the attaching ball in a recess formed in the insert carrier.
Figure 20:
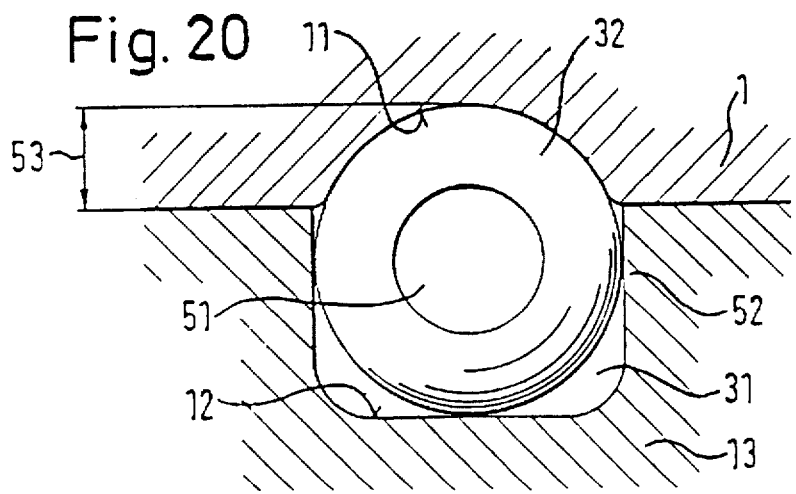
FIG. 20 a partial cross-sectional view showing the attachment of the insert with the insert carrier.
Figure 21:
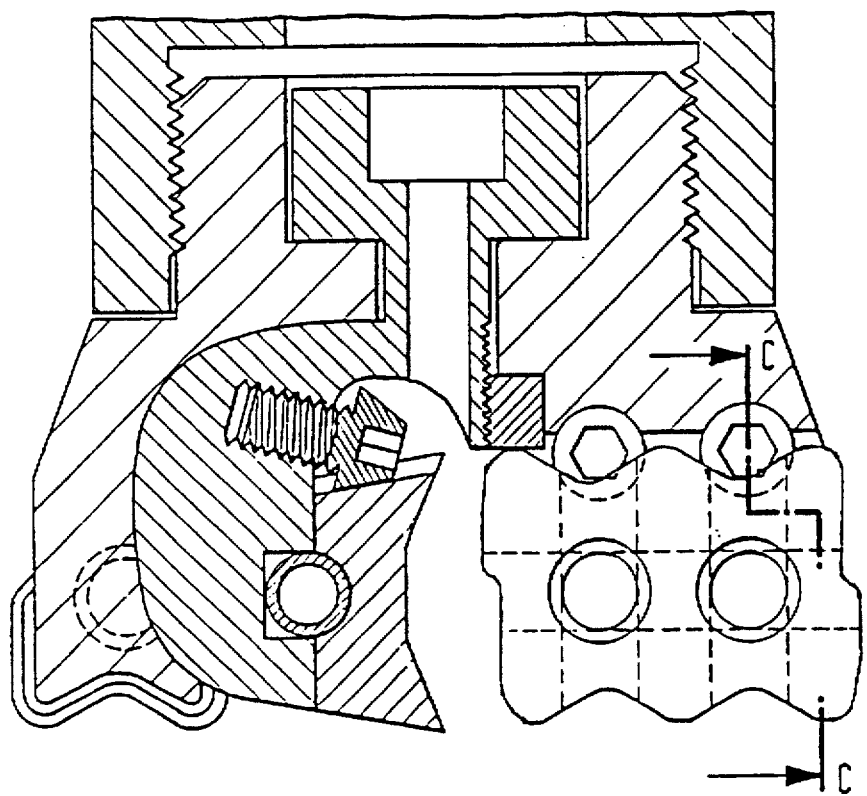
FIG. 21 a partial cross-sectional view of a milling cutter with reversible inserts having more than two face cutting edges.

For attaching the reversible insert 1, a hollow ball (FIGS. 18–20) can be used. At that, the ball 32 is provided with a through-bore 51, and the recess in the insert carrier 13 is formed to receive the ball 32 with a press fit and has a spherical shape 52 which provides for a free space 31. The reversible insert 1 is provided with a corresponding recess 53 having a depth with a ratio corresponding to the system (shown in FIG. 6). The rectilinear surface 54 formed in the ball bore is received in the corresponding recess in the insert carrier 13 without any backlash. With such an attachment system, always at least two balls should be used. It is further contemplated to insert a ring 17 into the recess of the insert carrier 13, with the head screw 28 and a contact surface 29 providing for precise positioning of the ring. The ring is provided, in the contact region 15 of the insert, with stud screws 16 which can be displaced from outside with a wrench to displace the insert in its seat in the micron region under pressure action for adjusting the concentricity. It is further contemplated to provide the tool shank 22, the stud screw carrying ring 17 and the head screw 28 with a bore 24 for conducting appropriate cooling medium. For thread milling in a solid material, the reversible insert 1 is equipped with an additional threading tooth 8 having a reduced size in a comparison with a thread-forming tooth 9. To provide for the utilization of new and the newest cutting materials, the cutting material 44, having a form of a respective reversible insert 1, is applied to a carrier material 45 likewise having a form of the insert, with the carrier material being provided with an appropriate holding system. Also, e.g., a one-piece milling cutter 31a, in order to form a thread in a solid hardened material, is likewise provided with an additional threading tooth 32a formed as a frontal tooth and having a reduced cutting edge dimension in comparison with and preceding thread-forming tooth 9. At that, these cutting edges are arranged as differently oriented teeth.

I claim:

1. A milling and drilling tool for forming circular openings having any diameter with a predetermined range in solid materials, the milling and drilling tool comprising:
   a shank;
   a reversible cutting insert attachable to the shank and having a plurality of face cutting edges, transitional regions between respective inner and outer flank cutting edges, and aligning and centering means provided on a contact surface of the insert associated with the shank for positioning of the insert with respect to the shank; and
   attachment means for attaching the insert to the shank,
      wherein face cutting edges, which form an inwardly directed V-shaped cutting geometry, together with associated therewith respective inner and outer flank cutting edges and transitional regions thereof, are arranged in pairs and are mutually offset by 180°,
      wherein outer flank cutting edges, which are provided on a same side of the insert, lie in different planes connected by a first chisel edge inclined to both planes and dividing the insert side into an outer cutting edge portion and an outer non-cutting edge portion, and
      wherein the cutting edge portion is divided by a second chisel-edge into a rough cutting portion and a finishing cutting portion, with the finishing cutting portion projecting slightly beyond the roughing cutting portion.

2. A milling and drilling tool according to claim 1, wherein the insert comprises a thread-forming cutting tooth shaped in accordance with a profile of a thread to be provided in an opening to be formed with the tool, arranged rearwardly of the outer cutting edge portion, and projecting beyond the plane of the cutting edge portion, and a threading tooth having a dimension reduced relative to the profile of the thread and arranged between the thread-forming tooth and the outer cutting edge portion.

3. A milling and drilling tool according to claim 2, wherein the cutting insert has a triangular cutting geometry.

4. A milling and drilling tool according to claim 1, wherein the tool further comprises an insert carrier attachable to the shank, and wherein the aligning and centering means comprises cup-shaped recesses cooperating with respective recesses formed in the insert carrier, and a plurality of thin-wall and elastically deformable bodies received in respective cavities formed by the cooperating recesses.

5. A milling and drilling tool according to claim 4, wherein the thin-wall and elastically deformable bodies comprises ones of small pipe sections and hollow balls.

6. A milling and drilling tool according to claim 4, wherein the cup-shaped recesses have a depth corresponding to about one-third of a diameter of the elastically deformable bodies, wherein the respective recesses formed in the insert carrier have a depth which is somewhat smaller then one-third of the diameter of the elastically deformable bodies, and wherein dimensions of the cup-shaped recesses and the respective recesses formed in the insert carrier are so selected that a free space for receiving an excess material, which results from deformation of the elastically deformable bodies when the insert is attached to the insert carrier, is formed.

7. A milling and drilling tool according to claim 1, wherein the roughing cutting edge portions extend at an angle to an axis of the tool and are provided with grooves.

8. A milling and drilling tool according to claim 1, wherein the flank cutting edges and the inwardly located face cutting edges extend at different angels, and wherein a number of V-shaped face cutting edges per an insert side exceeds two.

9. A milling and drilling tool according to claim 1, wherein the tool comprises a plurality of reversible cutting inserts arranged across a cutting width of the insert carrier, and wherein the V-shaped face cutting edges do not extend to the middle of the tool when a number of the face cutting edges is maximum.

10. A method of forming circular openings having any diameter within a predetermined range in solid materials, the method comprising the steps of:
   providing a milling and drilling tool comprising:
      a shank,
      a reversible cutting insert attachable to the shank and having a plurality of face cutting edges for forming cored openings, a plurality of inner and outer flank cutting edges, transitional regions between respective inner and outer flank cutting edges, and aligning centering means provided on a contact surface of the insert associated with the shank for positioning of the insert with respect to the shank, and attachment means for attaching the insert to the shank,
      wherein face cutting edges, which form an inwardly directed v-shaped cutting geometry, together with associated therewith respective inner and outer flank cutting edges and transitional regions thereof, are arranged in pairs and are mutually offset by 180°,
      wherein outer flank cutting edges, which are provided on a same side of the insert, lie in different planes connected by a chisel edge inclined to both planes and dividing the insert side into an outer cutting edge portion and an outer non-cutting edge portion, and
      wherein the cutting edge portion is divided by a further chisel edge into a roughing cutting portion and a finishing cutting portion, with the finishing cutting portion projecting slightly beyond the roughing cutting portion;
   effecting a roughing operation by forming an opening having a predetermined diameter and depth by rotating the tool and simultaneously advancing the tool axially into the solid material up to a predetermined depth;
   thereafter, effecting only rotation of the tool for forming a flat base surface of the opening; and
   thereafter, effecting a finishing operation by rotating the tool and withdrawing it from the opening.

* * * * *